US008577585B2

(12) United States Patent
Atmur et al.

(10) Patent No.: US 8,577,585 B2
(45) Date of Patent: Nov. 5, 2013

(54) TRANSPORT AND HANDLING SYSTEM AND METHODS OF TRANSPORTING A COMMODITY (75) Inventors: Robert J. Atmur, Whittier, CA (US); Deborah Ann Beron-Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/342,610

(22) Filed: Jan. 3, 2012

(65) Prior Publication Data
US 2013/0173146 A1    Jul. 4, 2013

(51) Int. Cl.
*G08G 1/00*    (2006.01)
(52) U.S. Cl.
USPC ..... 701/117; 104/290; 310/12.01; 310/12.09; 310/12.19; 318/135; 318/38
(58) Field of Classification Search
USPC ........................ 701/117; 318/38, 135; 104/29; 310/12.01, 12.09, 12.19
See application file for complete search history.

(56) References Cited

U.S. PATENT DOCUMENTS

| 4,172,685 | A |   | 10/1979 | Nabeshima et al. |
|---|---|---|---|---|
| 4,633,148 | A | * | 12/1986 | Prucher .......................... 318/135 |
| 4,671,186 | A |   | 6/1987 | Kunczynski |
| 4,973,219 | A |   | 11/1990 | Brickner et al. |
| 6,095,054 | A | * | 8/2000 | Kawano et al. ............... 104/139 |
| 6,507,777 | B1 | * | 1/2003 | Pinlam et al. ................... 701/23 |
| 6,826,452 | B1 |   | 11/2004 | Holland et al. |
| 6,853,876 | B2 |   | 2/2005 | Wehrung et al. |
| 7,324,921 | B2 |   | 1/2008 | Sugahara et al. |
| 7,484,663 | B2 |   | 2/2009 | Olsen, III et al. |
| 7,689,230 | B2 |   | 3/2010 | Spadafora et al. |
| 7,698,029 | B2 |   | 4/2010 | Atmur et al. |
| 7,742,745 | B2 |   | 6/2010 | Twitchell, Jr. |
| 7,830,852 | B2 |   | 11/2010 | Twitchell, Jr. |
| 8,068,807 | B2 |   | 11/2011 | Twitchell, Jr. |
| 2010/0076591 | A1 |   | 3/2010 | Lert, Jr. |
| 2011/0061558 | A1 | * | 3/2011 | Crawford et al. ............... 104/53 |
| 2011/0215948 | A1 |   | 9/2011 | Borgerson et al. |
| 2011/0241845 | A1 |   | 10/2011 | Sullivan et al. |

OTHER PUBLICATIONS

Head to Head for Today's State-of-the-art Robotised Container Transportation Equipment, Freight Newsletter, Sep. 9, 2010 available at http://www.freight-int.com/article/head-to-head-for-todays-stateoftheart-robotised-container-transportation-equipment.html (last viewed Dec. 20, 2011).
International Search Report and Written Opinion of International Application No. PCT/US12167109; Apr. 19, 2013; 8 pages.

* cited by examiner

*Primary Examiner* — Mary Cheung
*Assistant Examiner* — Brian P Sweeney
(74) *Attorney, Agent, or Firm* — Armstrong Teasdale LLP (57) ABSTRACT

A transportation system for use in transporting commodities is described herein. The transportation system includes a transportation network that includes a plurality of predefined paths of travel extending between a plurality of locations, and a plurality of transport vehicles. Each transport vehicle of the plurality of transport vehicles is configured to independently travel along the transportation network. A plurality of motor assemblies is oriented along the transportation network. Each motor assembly of the plurality of motor assemblies is oriented with respect to a predefined segment of the transportation network, and configured to move the transport vehicle along the predefined segment. A control system is operatively coupled to each motor assembly to selectively operate each motor assembly to independently convey each transport vehicle of the plurality of transport vehicles along the transportation network.

19 Claims, 4 Drawing Sheets

TRANSPORT AND HANDLING SYSTEM AND METHODS OF TRANSPORTING A COMMODITY

BACKGROUND

The field of the disclosure relates generally to transportation systems, and more specifically, to a transport and handling system and method of transporting a commodity.

At least some known commodity transportation systems include automated systems configured to receive a plurality of commodities from a delivery vehicle such as a ship or a railcar, and store the commodity in a receiving location. Vehicle operators operate manned vehicles to convey the commodities from the storage location to a delivery location for delivery to a railcar or truck for delivery to an end user of the commodity.

In known commodity transportation systems, delays due to congestion are common, because of the extensive manpower required to convey the commodities from the receiving location to the destination location. When the number of commodities entering a transportation system exceeds the number of commodities that can be safely handled by available vehicle operators (limited by the number of vehicle operators, vehicles, and available space to operate the vehicles), delays are imposed on commodity delivery. This uncertainty results in decreased system capacity and increased cost to convey commodities due to the increased time the commodity is stored within the system.

BRIEF DESCRIPTION

In one embodiment, a transportation system for use in transporting commodities is provided. The transportation system includes a transportation network that includes a plurality of predefined paths of travel extending between a plurality of locations, and a plurality of transport vehicles. Each transport vehicle of the plurality of transport vehicles is configured to independently travel along the transportation network. A plurality of motor assemblies is oriented along the transportation network. Each motor assembly of the plurality of motor assemblies is oriented with respect to a predefined segment of the transportation network, and configured to move the transport vehicle along the predefined segment. A control system is operatively coupled to each motor assembly to selectively operate each motor assembly to independently convey each transport vehicle of the plurality of transport vehicles along the transportation network.

In another embodiment, a transportation management system for use in automatically conveying a commodity along a transportation network is provided. The transportation network includes a plurality of predefined paths of travel that extend between a plurality of locations. The transportation management system includes a processor that is configured to receive a request to convey a commodity along the transportation network, and assign a transport vehicle to convey the commodity along the transportation network. The processor is also configured to calculate a vehicle path trajectory along the transportation network including an origin waypoint and a destination waypoint based at least in part on the location of the assigned transport vehicle along the transportation network, and convey the assigned transport vehicle along the determined transportation trajectory.

In yet another embodiment, a method of transporting a commodity along a transportation network is provided. The method includes receiving, by a transport management system, a request to convey a commodity along a transportation network, wherein the transportation network includes a plurality of predefined paths of travel extending between a plurality of locations. A transport vehicle is assigned to convey the commodity along the transportation network. A vehicle path trajectory including an origin waypoint and a destination waypoint is determined based at least in part on the location of the assigned transport vehicle along the transportation network. The assigned transport vehicle is conveyed along the determined transportation trajectory.

The features, functions, and advantages that have been discussed can be achieved independently in various embodiments or may be combined in yet other embodiments, further details of which can be seen with reference to the following description and drawings.

DETAILED DESCRIPTION

The exemplary methods and systems described herein overcome at least some disadvantages of known transportation systems by providing a transportation system that includes a plurality of predefined paths of travel that define a transportation network, and a plurality of transport vehicles configured to independently travel along the transportation network to convey commodities between a plurality of locations along the transportation network. In addition, the transportation system includes a plurality of motor assemblies oriented along the transportation network, and configured to move each transport vehicle along the transportation network. In addition, the transportation system includes a transportation management system that is configured to calculate a vehicle path trajectory along the transportation network and operate each motor assembly to move convey a transport vehicle along the calculated vehicle path trajectory. By generating a vehicle path trajectory along a predefined transportation network, the intent or future position of the transport vehicle and/or commodity being conveyed by the transport vehicle enables a user to reduce the uncertainty in commodity locations and delivery arrivals.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

As used herein, the term "commodity" refers generally to goods, equipment, materials, storage containers, and/or any other item that may be loaded and/or unloaded from a transport vehicle and conveyed along a transportation network.

A controller, computing device, or computer, such as described herein, includes at least one or more processors or processing units and a system memory. The controller typically also includes at least some form of computer readable media. By way of example and not limitation, computer readable media may include tangible computer storage media. Computer storage media may include volatile and nonvolatile, removable and non-removable media implemented in any method or technology that enables storage of information, such as computer readable instructions, data structures, program modules, or other data. Computer storage media typically embody computer readable instructions, data structures, program modules, or other data.

Although described in connection with an exemplary transportation network environment, embodiments described herein are operational with numerous other general purpose or special purpose computing system environments or configurations. The system environment is not intended to suggest any limitation as to the scope of use or functionality of any aspect of the subject matter describe herein. Moreover, the system environment should not be interpreted as having any dependency or requirement relating to any one or combination of components illustrated in the exemplary operating environment. Examples of well known systems, environments, and/or configurations that may be suitable for use with the embodiments described herein include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in the embodiments described herein is not essential, unless otherwise specified. That is, the operations described herein may be performed in any order, unless otherwise specified, and embodiments may include additional or fewer operations than those disclosed herein. For example, it is contemplated that executing or performing a particular operation before, contemporaneously with, or after another operation is within the scope of aspects of the embodiments.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a memory device, as described herein, includes a computer readable medium, such as, without limitation, random access memory (RAM), flash memory, a hard disk drive, a solid state drive, a diskette, a flash drive, a compact disc, a digital video disc, and/or any suitable device that enables a processor to store, retrieve, and/or execute instructions and/or data.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, the technical effect of the methods, systems, and computers described herein includes at least one of (a) receiving, by a transport management system, a request to convey a commodity along a transportation network, the transportation network includes a plurality of predefined paths of travel extending between a plurality of locations; (b) assigning a transport vehicle to convey the commodity along the transportation network; (c) determining a vehicle path trajectory including an origin waypoint and a destination waypoint based at least in part on the location of the assigned transport vehicle along the transportation network; and (d) conveying the assigned transport vehicle along the determined transportation trajectory.

Figure 1:
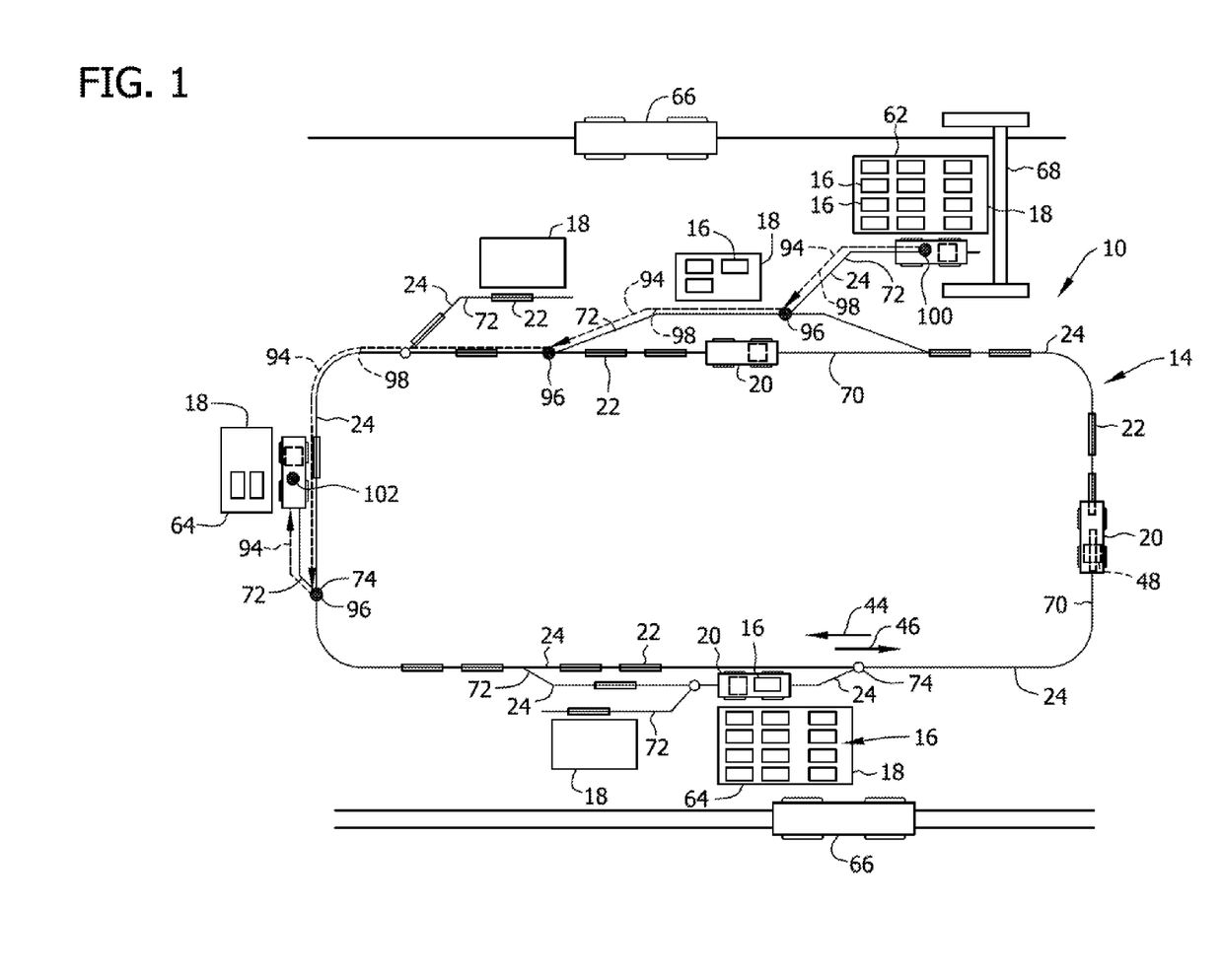
FIG. 1 is a schematic diagram of an exemplary transport and handling system.
Figure 2:
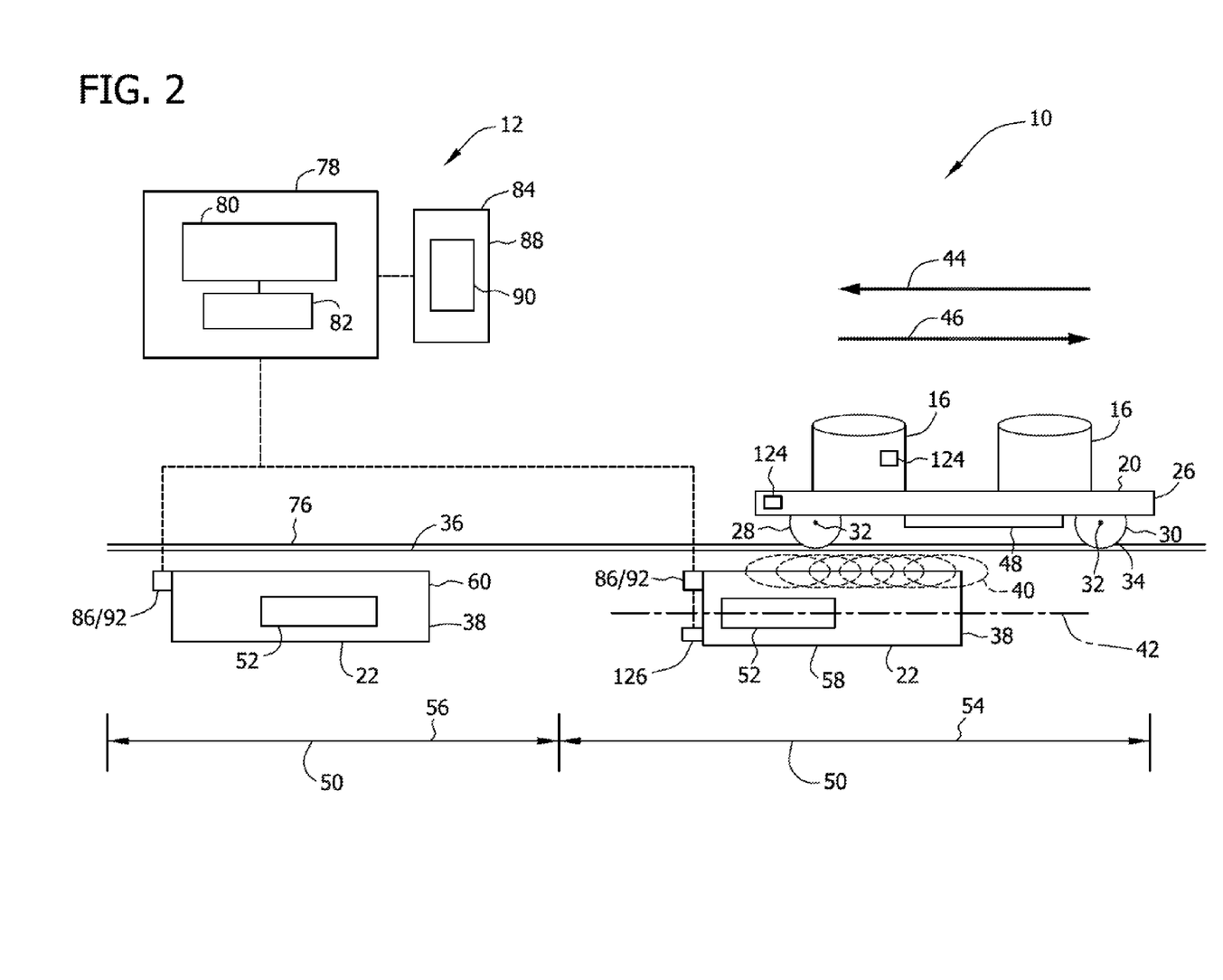
FIG. 2 is a schematic side view of a portion of the transportation system shown in FIG. 1.
Figure 3:
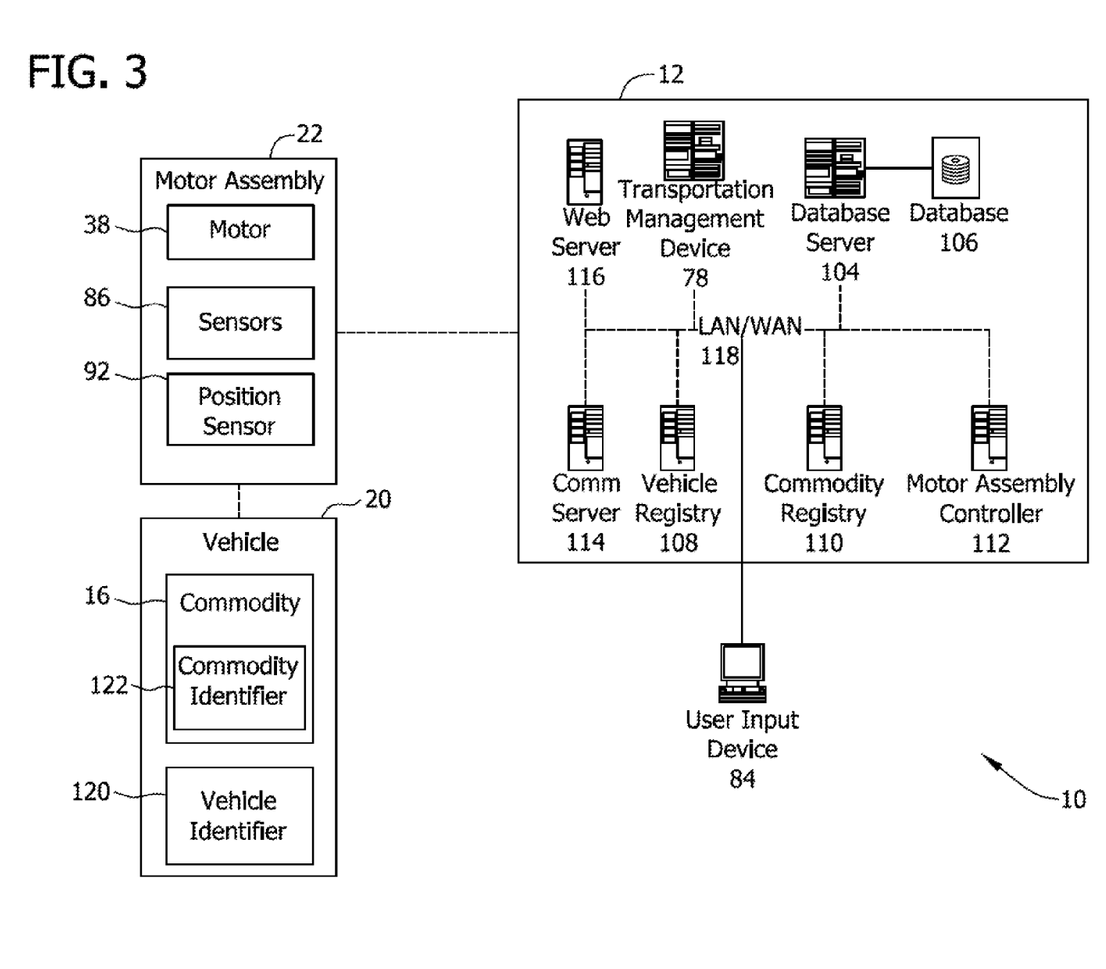
FIG. 3 is a block diagram of an exemplary control system that may be used with the transportation network shown in FIG. 1.

FIG. 1 is a schematic diagram of an exemplary transport and handling system 10. FIG. 2 is a schematic side view of a portion of transport and handling system 10. FIG. 3 is a block diagram of an exemplary control system 12 that may be used with transport and handling system 10. In the exemplary embodiment, transport and handling system 10 includes a transportation network 14 configured to move a plurality of commodities 16 between a plurality of locations 18, a plurality of transport vehicles 20 configured to travel along transportation network 14 to convey commodities 16 between each location 18, and a plurality of motor assemblies 22 configured to convey each transport vehicle 20 along transportation network 14. Transportation network 14 includes a plurality of predefined paths of travel 24 that extend between each location 18. Each motor assembly 22 is oriented along transportation network 14, and is configured to convey each transport vehicle 20 along transportation network 14. Moreover, each transport vehicle 20 is configured to travel along transportation network 14 independent of other transport vehicles 20. Transport vehicle 20 is configured to receive one or more commodities 16 from one location 18, and to selectively convey commodity 16 to another location 18 along transportation network 14. In the exemplary embodiment, transport and handling system 10 also includes a control system, i.e. a transportation management system 12. Transportation management system 12 is coupled in operative communication with each motor assembly 22 to selectively operate each motor assembly 22 to independently convey each transport vehicle 20 along transportation network 14.

Each location 18 is configured to store a plurality of commodities 16 therewithin, and enable each commodity 16 to be removed and/or stored within location 18 for a predefined period of time. Each location 18 is also configured to enable commodity 16 to be placed on and/or removed from transport vehicle 20 to enable transport vehicle 20 to convey commodity 16 along transportation network 14.

In the exemplary embodiment as shown in FIG. 2, transport vehicle 20 includes a platform 26 that extends between a forward wheel assembly 28, and a rear wheel assembly 30. Forward wheel assembly 28 and rear wheel assembly 30 each includes an axle 32 that is attached to one or more wheels 34. Wheel assemblies 28 and 30 are configured to support platform 26 from a supporting surface 36, and travel along supporting surface 36. Platform 26 is configured to support one or more commodities 16 to enable transport vehicle 20 to convey commodity 16 along transportation network 14.

In the exemplary embodiment, each motor assembly 22 is positioned below, and/or embedded within, supporting surface 36 such that transport vehicle 20 is oriented above each motor assembly 22. In embodiments, motor assembly 22 includes a magnetic linear induction motor 38 that is configured to generate a magnetic field, represented by phantom lines 40, and to move the generated magnetic field 40 along a longitudinal axis 42 of induction motor 38 to facilitate moving a corresponding transport vehicle 20 along transportation network 14 corresponding to magnetic flied 40. Transportation management system 12 operates linear induction motor 38 to selectively generate magnetic field 40 to move transport vehicle 20 with respect to linear induction motor 38 in a first direction 44 and a second direction 46 that is different than first direction 44. Moreover, transportation management system 12 operates linear induction motor 38 to control a rate of speed of transport vehicle 20 along transportation network 14. In the exemplary embodiment as shown in FIG. 2, transport vehicle 20 includes a magnetic plate assembly 48 that is configured to interact with magnetic field 40 such that magnetic field 40 acts upon magnetic plate assembly 48 to move transport vehicle 20. Alternatively, transport vehicle 20 does not include magnetic plate assembly 48, and platform 26 and/or wheel assemblies 28 and 30 are each configured to interact with magnetic field 40.

One or more motor assembly 22 are oriented with respect to a predefined network segment 50 of transportation network 14, and are configured to convey each transport vehicle 20 along a corresponding predefined network segment 50. In the exemplary embodiment, adjacent motor assemblies 22 are axially spaced along transportation network 14. In addition, each motor assembly 22 is configured to generate magnetic field 40 only when a transport vehicle 20 is within a corresponding network segment 50. Moreover, each motor assembly 22 includes a passive braking system 52 that is configured to reduce a movement of transport vehicle 20 upon a loss of electrical power to motor assembly 22. More specifically, during a power loss event, wherein electrical power supplied to motor assembly 22 is interrupted, motor assembly 22 is configured to generate magnetic field 40, and move magnetic field 40 in an opposite direction of movement of transport vehicle 20. Magnetic field 40 acts upon transport vehicle 20 to reduce a speed of transport vehicle 20 and to provide braking of transport vehicle 20.

In addition, transportation management system 12 is configured to energize a motor assembly 22 when a transport vehicle 20 is oriented with respect to a predefined network segment 50 that is associated with the motor assembly 22, and to de-energize motor assembly 22 when transport vehicle 20 is not located within associated network segment 50. More specifically, in the exemplary embodiment, transport and handling system 10 includes a first network segment 54, and a second network segment 56 coupled to first network segment 54. In addition, a first motor assembly 58 is oriented with respect to first network segment 54, and a second motor assembly 60 is oriented with respect to second network segment 56. In the exemplary embodiment, transportation management system 12 determines whether transport vehicle 20 is within first network segment 54, and energizes first motor assembly 58 upon determining that transport vehicle 20 is within first network segment 54 to move transport vehicle 20 from first network segment 54 to second network segment 56. In addition, transportation management system 12 de-energizes first motor assembly 58 upon determining that transport vehicle 20 is not within first network segment 54, and energizes second motor assembly 60 upon determining transport vehicle 20 is within second network segment 56.

In the exemplary embodiment, transportation network 14 includes an origin location 62 and a destination location 64. Origin location 62 is configured to receive a plurality of commodities 16 from a plurality of delivery vehicles 66 such as, for example, a railcar, an ocean vessel, an airplane, a truck, an automobile, a forklift, and/or any delivery vehicle that enables transport and handling system 10 to function as described herein to enable commodity 16 to enter transport and handling system 10. Moreover, origin location 62 is configured to store each commodity 16 therein, and to selectively deliver commodity 16 to a transport vehicle 20 that is positioned within origin location 62. Similarly, destination location 64 is configured to receive commodity 16 from transport vehicle 20, and store a plurality of commodities 16 therewithin. In some embodiments, destination location 64 is configured to convey commodity 16 to a plurality of delivery vehicles 66 to enable commodity 16 to exit transport and handling system 10.

In one embodiment, transport and handling system 10 includes a plurality of loading assemblies 68 positioned at each location 18 for loading and unloading commodity 16 to and from transport vehicle 20, and positioning commodity 16 within location 18. Moreover, loading assembly 68 is configured to reposition commodities 16 within location 18 to facilitate storing commodities 16 within location 18 for a predefined period of time.

In the exemplary embodiment, transportation network 14 also includes a central travel line 70 that extends between each location 18, and a plurality of branch lines 72 that extend from central travel line 70 to couple a corresponding location 18 to central travel line 70. A plurality of passive switching structures 74 are coupled between central travel line 70 and each branch line 72. Each passive switching structure 74 is configured to enable transport vehicle 20 to travel along central travel line 70 when transport vehicle 20 is traveling in first direction 44, and to enable transport vehicle 20 to travel from central travel line 70 to a corresponding branch line 72 when transport vehicle 20 is traveling in second direction 46 that is different than first direction 44. In one embodiment, passive switching structure 74 does not include any moving parts.

In one embodiment, transportation network 14 includes a plurality of rails 76 that are coupled to supporting surface 36, and that extend between each location 18 to form transportation network 14. Each transport vehicle 20 is configured to travel along each rail 76 to facilitate conveying commodity 16 to and from each location 18. Alternatively, transportation network 14 may include an embedded wire assembly (not shown) that includes an electrical conduit (not shown) coupled to supporting surface 36 along transportation network 14. The electrical conduit is configured to generate a magnetic field to guide transport vehicle 20 along transportation network 14. Each transport vehicle 20 includes a steering controller (not shown) that is operatively coupled to a steering assembly (not shown). The steering assembly is coupled to a steerable wheel assembly 28 to adjust an orientation of steerable wheel assembly 28 to facilitate adjusting a direction of travel of transport vehicle 20. The steering controller includes at least one directional sensor (not shown) for sensing a location of the electrical conduit. The steering controller receives a signal from the directional sensor that is indicative of a path of travel of transportation network 14, and operates the steering assembly to adjust an orientation of steerable wheel assembly 28 based at least in part on the received signal to adjust a direction of transport vehicle 20 such that transport vehicle 20 travels along transportation network 14.

In the exemplary embodiment, transportation management system 12 includes a transportation management device 78 that includes a processor 80 coupled to a memory device 82, a user input device 84 coupled to processor 80, and a plurality of sensors 86 that are coupled to processor 80. Transportation management device 78 is coupled in operative communication with each motor assembly 22 to selectively operate each motor assembly 22 to move each transport vehicle 20 along transportation network 14. In addition, transportation management device 78 is coupled to each loading assembly 68 to load commodity 16 from location 18 onto transport vehicle 20, to unload commodity 16 from transport vehicle 20 to location 18, and/or to convey commodity 16 from location 18 to delivery vehicle 66.

User input device 84 enables a user to access transportation management system 12, and request information associated with transportation network 14, commodity 16, transport vehicle 20, loading assembly 68, and/or motor assembly 22. In addition, user input device 84 enables a user to request transportation management system 12 to convey a commodity from a first location, i.e. origin location 62 to a second location, i.e. destination location 64, and initiate an operation of transport and handling system 10 to convey commodity 16 to the desired location. In the exemplary embodiment, user input device 84 includes a display 88 and a user interface 90. Display 88, in the exemplary embodiment, includes a vacuum fluorescent display (VFD) and/or one or more light-emitting diodes (LED). Additionally or alternatively, display 88 may include, without limitation, a liquid crystal display (LCD), a cathode ray tube (CRT), a plasma display, and/or any suitable visual output device capable of displaying graphical data and/or text to the user. In an exemplary embodiment, a conveyance request, a commodity position, a transport vehicle position, a duration of travel by commodity 16 through transportation network 14, an expected arrival time of commodity 16, and/or any other information may be displayed to the user on display 88. User interface 90 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables the user to input data into processor 80 and/or to retrieve data from processor 80. In one embodiment, user interface 90 is integrated with display 88 such that user interface 90 is accessed by the user via display 88.

Each sensor 86 senses various parameters relative to the operation of motor assembly 22, loading assemblies 68, and transport vehicle 20, and parameters relative to a location and position of transport vehicle 20 and/or commodity 16 along transportation network 14. Sensors 86 may include, but are not limited to only including, position sensors, speed sensors, power output sensors, and/or any other sensors that sense various parameters relative to the condition of commodity 16, transport vehicle 20, motor assembly 22, transportation network 14, and/or loading assemblies 68. As used herein, the term "parameters" refers to physical properties whose values can be used to define the operating conditions of commodity 16, transport vehicle 20, motor assembly 22, transportation network 14, and/or loading assemblies 68, such as a position along transportation network 14, a power output, and/or a speed at defined locations. In the exemplary embodiment, transportation management system 12 includes at least one position sensor 92 coupled to each motor assembly 22 for sensing a position of transport vehicle 20 with respect to motor assembly 22, and transmitting a signal indicative of the sensed position to processor 80.

Various connections are available between transportation management device 78, sensors 86, motor assembly 22, transport vehicle 20, commodity 16, and/or loading assembly 68. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible transport and handling system 10) network connection, whether wired or wireless.

In the exemplary embodiment, transportation management device 78 receives, from user input device 84, a request to convey commodity 16 from origin location 62 to destination location 64. Transportation management device 78 determines a current position of each transport vehicle 20 along transportation network 14, and assigns a transport vehicle 20 to convey commodity 16 based at least in part on the current position of transport vehicle 20. In addition, transportation management device 78 calculates a vehicle path trajectory, represented by arrow 94, to convey commodity 16 from origin location 62 to destination location 64, and operates motor assemblies 22 to move transport vehicle 20 along the calculated vehicle path trajectory 94. Vehicle path trajectory 94 includes a plurality of waypoints 96 and a plurality of vectors 98. Each waypoint 96 includes a position along transportation network 14, and an expected time of arrival. In one embodiment, waypoint 96 may include, for example, a latitude coordinate and a longitude coordinate within transportation network 14. In the exemplary embodiment, each vector 98 extends between adjacent waypoints 96 to define vehicle path trajectory 94. In one embodiment, vector 98 extends between a first waypoint, i.e. an origin waypoint 100 and a second waypoint, i.e. a destination waypoint 102, and includes a series of operations that are performed by corresponding motor assemblies 22 to enable transport vehicle 20 to travel from first waypoint 100 to second waypoint 102 such that transport vehicle 20 arrives at second waypoint 102 at a predefined time of arrival.

In the exemplary embodiment, transportation management system 12 also includes a database server 104, a database 106, a vehicle registry device 108, a commodity registry device 110, a motor assembly controller 112, a communication server 114, and a web server 116. User input device 84, database 106, devices 78, 108, and 110, controller 112, and servers 104, 114, and 116 are coupled in a communications network 118, such as the Internet and/or an intranet, and are interconnected through many interfaces including a network, such as a local area network (LAN), a wide area network (WAN), dial-in-connections, cable modems, wireless modems, and/or special high-speed Integrated Services Digital Network (ISDN) lines. In one embodiment, a user may access transportation management system 12 via web server 116 to access vehicle registry device 108 and/or commodity registry device 110.

Database server 104 is connected to database 106 that contains information on a variety of matters such as, for example, location and operational status information related to transport vehicle 20, location and arrival time of delivery vehicle 66, and/or location and status information related to commodity 16. Operational status of transport vehicle 20 may include, but is not limited to including, vehicle path trajectory 94 including waypoints 96, vectors 98, current location along vehicle path trajectory 94, estimate time of arrival at origin waypoint 100 and/or destination waypoint 102, loaded and unloaded condition of transport vehicle 20, and/or any information related to the operation of transport vehicle 20. Status information related to commodity 16 may include, but is not limited to only including, contents or type of commodity 16 positioned along transportation network 14 and/or location 18, estimated time of delivery from delivery vehicle 66 to location 18, estimated time of conveyance from origin location 62 to destination location 64, loaded or stored condition, and/or any information related to the operational status of commodity 16.

In the exemplary embodiment, each transport vehicle 20 includes a unique vehicle identifier 120 that is used by transportation management system 12 to identify transport vehicle 20 to determine a location of transport vehicle 20 along transportation network 14. In addition, each commodity 16 includes a unique commodity identifier 122 that is used by transportation management system 12 to identify commodity 16 to determine a position of commodity 16 within transportation network 14. In one embodiment, transport vehicle 20 and commodity 16 each includes a radio frequency identification (RFID) device 124 that transmits an RFID signal indicative of unique identifiers 120 and 122, respectively. Each motor assembly 22 includes an RFID receiver 126 that is configured to receive unique identifiers 120 and 122 and transmit a signal indicative of the sensed unique identifiers 120 and 122 to processor 80. Alternatively, transport vehicle 20 and/or commodity 16 may include any device suitable to enable transportation management system 12 to receive unique identifiers 120 and 122.

In the exemplary embodiment, commodity registry device 110 is coupled to database 106 and includes a collection of unique commodity identifiers 122 and a collection of commodity accounts that are each associated with a unique commodity identifier 122. Commodity accounts include location and status information related to commodity 16 retrieved from database 106. A user may access commodity registry device 110 to create an commodity account including, but not limited to only including, commodity manifest information, estimated time of arrival at origin location 62, and/or desired time of departure from destination location 64.

Vehicle registry device 108 is coupled to database 106 and includes a collection of unique vehicle identifiers 120 and a collection of transport vehicle accounts that are each associated with a unique vehicle identifier 120. Transport vehicle accounts include location and operational status information related to transport vehicle 20 and/or vehicle path trajectory 94 retrieved from database 106.

Motor assembly controller 112 is coupled to each motor assembly 22 to operate each motor assembly 22 to move transport vehicle 20 along transportation network 14, and along the calculated vehicle path trajectory 94 associated with transport vehicle 20. Motor assembly controller 112 receives a signal indicative of the calculated vehicle path trajectory 94 from transportation management device 78, and operates each motor assembly 22 in accordance with the calculated vehicle path trajectory 94. In addition, motor assembly controller 112 receives signals indicative of a position and a speed of transport vehicle 20 from each motor assembly 22, and determines a position and speed of transport vehicle 20 along transportation network 14 based at least in part on the sensed vehicle position and speed. In addition, motor assembly controller 112 transmits signals indicative of a position and speed of each transport vehicle 20 to vehicle registry device 108 to update vehicle position, speed, and vehicle path trajectory 94 contained in database 106. Moreover, motor assembly controller 112 receives signals indicative of a position of commodity 16 from each motor assembly 22, and transmits the sensed position to commodity registry device 110 to update commodity position contained in database 106.

In the exemplary embodiment, transportation management device 78 receives signals indicative of a transport vehicle position and speed from motor assembly controller 112, and calculates a current vehicle path trajectory based at least in part on the current transport vehicle position and location. Transportation management device 78 compares the calculated current vehicle path trajectory with the planned vehicle path trajectory 94. In one embodiment, transportation management device 78 determines a condition of transport and handling system 10 to be less than a predefined condition if the current vehicle path trajectory is different than the planned vehicle path trajectory 94, and transmits a notification message to user input device 84. In another embodiment, transportation management device 78 calculates an expected arrival time of commodity 16 at destination location 64, and adjusts vehicle path trajectory 94 to enable commodity 16 to arrive at destination location 64 within a predefined range of arrival times.

In the exemplary embodiment, upon receiving a request to convey commodity 16, transportation management device 78 transmits a request to assign a transport vehicle 20 to deliver the commodity 16 to vehicle registry device 108. Vehicle registry device 108 determines a status of each transport vehicle 20 and transmits a verification message indicative of a position and operational status of each transport vehicle 20 to transportation management device 78. Transportation management device 78 assigns a transport vehicle 20 to convey commodity 16 based at least in part on the determined status of each transport vehicle 20. In one embodiment, transportation management device 78 calculates a plurality of vehicle path trajectories 94 corresponding to each transport vehicle 20, and assigns a transport vehicle 20 to convey commodity 16 based at least in part on the calculated vehicle path trajectories 94.

Upon assigning a transport vehicle 20, vehicle registry device 108 transmits a verification message including unique vehicle identifier 120 associated with the assigned transport vehicle 20. Transportation management device 78 determines a location of assigned transport vehicle 20 associated with unique vehicle identifier 120. Transportation management device 78 determines a vehicle path trajectory 94 from the determined vehicle location to origin waypoint 100 and to destination waypoint 102, and selectively operates each motor assembly oriented along determined vehicle path trajectory 94 to convey assigned transport vehicle 20 along vehicle path trajectory 94. In addition, transportation management device 78 transmits a communication request to communication server 114 to deliver a notification message, such as an email message, a mobile text message, or any other wired and/or wireless communication message, to the user and/or user input device 84 indicating a transport vehicle position and speed along transportation network 14, commodity origin location, commodity destination location, vehicle path trajectory, and/or estimated time of arrival.

In one embodiment, transportation management device 78 receives a request to convey commodity 16 to destination location 64, and transmits, to commodity registry device 110, a request including a unique commodity identifier 122 to identify a position and a status of commodity 16 along transportation network 14. Commodity registry device 110 determines a status of commodity 16 associated with unique commodity identifier 122, and transmits a verification message indicative of a position and status of commodity 16. Transportation management device 78 assigns a transport vehicle 20 to deliver commodity 16, and calculates vehicle path trajectory 94 including an origin waypoint 100 that is associated with the determined commodity location, and a destination waypoint 102 that is associated with the requested destination location 64.

Figure 4:
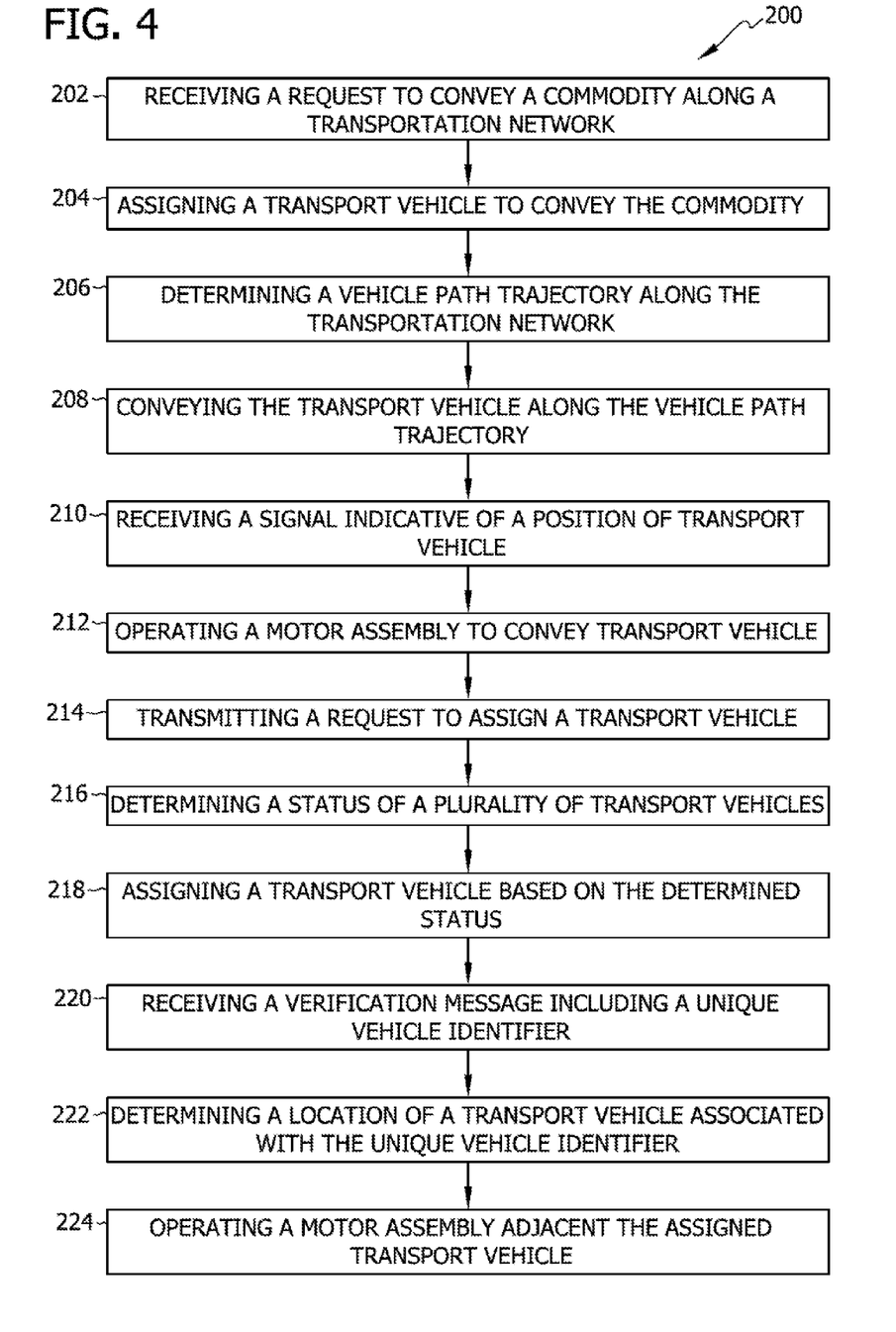
FIG. 4 is a flow chart of an exemplary method that may be used in transporting commodities within the transportation system shown in FIG. 1.

FIG. 4 is a flow chart of an exemplary method 200 that may be used in transporting commodities 16 within transport and handling system 10. In the exemplary embodiment, method 200 includes receiving 202 a request to convey commodity 16 along transportation network 14, and assigning 204 a transport vehicle to convey commodity 16. A vehicle path trajectory 94 along transportation network 14 is determined 206 including origin waypoint 100 for receiving commodity 16 and destination waypoint 102 for offloading commodity 16 based at least in part on a location of the assigned transport vehicle 20, and the assigned transport vehicle 20 is conveyed 208 along the determined vehicle path trajectory 94.

Method 200 also includes receiving 210 a signal indicative of a position of transport vehicle 20 along transportation network 14, and selectively operating 212 a motor assembly 22 adjacent the sensed vehicle position to convey transport vehicle 20 along transportation network 14. In addition, method 200 includes transmitting 214 a request to assign a transport vehicle 20 to deliver commodity 16, determining 216 a status of a plurality of transport vehicles 20, and assigning 218 a transport vehicle 20 based at least in part on the determined status of each transport vehicle 20. In addition, a verification message including a unique vehicle identifier 120 that is associated with assigned transport vehicle 20 is received 220, a location of transport vehicle 20 associated with unique vehicle identifier 120 is determined 222, and a motor assembly 22 adjacent assigned transport vehicle 20 is selectively operated 224 to convey assigned transport vehicle 20.

In one embodiment, method 200 also includes receiving a request to deliver commodity 16 to a destination location 64, determining a location of the requested commodity 16, and determining a vehicle path trajectory 94 including an origin waypoint 100 associated with the determined commodity location, and a destination waypoint 102 associated with destination location 64.

In another embodiment, method 200 includes receiving a signal indicative of a position of each transport vehicle 20 along transportation network 14, and assigning a transport vehicle 20 based at least in part on the sensed position of each transport vehicle 20. In another embodiment, method 200 includes receiving a signal indicative of an operating status of each transport vehicle 20, and assigning a transport vehicle 20 to convey commodity 16 based at least in part on the operating status.

The above-described systems and methods overcome at least some disadvantages of known transportation systems by calculating a vehicle path trajectory along a transportation network, and operating a plurality of motor assemblies to move a transport vehicle along the calculated vehicle path trajectory. Moreover, the embodiments described herein include a transportation system that includes a plurality of predefined paths of travel that define the transportation network. Each transport vehicle is configured to independently travel along the transportation network to convey commodities between a plurality of locations along the transportation network. A transportation management system calculates a vehicle path trajectory along the transportation network and operates each motor assembly to convey a transport vehicle along the calculated vehicle path trajectory. By generating a vehicle path trajectory along a predefined transportation network, the intent or future position of the transport vehicle and/or commodity being conveyed by the transport vehicle enables a user reduce the uncertainty in commodity locations and delivery arrivals. As a result, the methods and systems described herein facilitate conveying commodities in a cost-effective and reliable manner.

Exemplary embodiments of a transport and handling system and methods of transporting a commodity are described above in detail. The transport and handling system, and methods are not limited to the specific embodiments described herein, but rather, components of the transport and handling and/or steps of the method may be utilized independently and separately from other components and/or steps described herein. For example, the transport and handling system may also be used in combination with other conveyance systems and methods, and is not limited to practice with only the transportation system as described herein. Rather, an exemplary embodiment can be implemented and utilized in connection with many other conveyance system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transport and handling system for use in transporting commodities, said system comprising:
   a transportation network comprising a plurality of predefined paths of travel extending between a plurality of locations;
   a plurality of transport vehicles, each transport vehicle of said plurality of transport vehicles is configured to independently travel along said transportation network;
   a plurality of motor assemblies oriented along said transportation network, each motor assembly of said plurality of motor assemblies is oriented with respect to a predefined segment of said transportation network and configured to convey each of said transport vehicles along the predefined segment, each motor assembly comprising a passive breaking system that is configured to brake said plurality of transport vehicles upon a loss of electrical power to said motor assembly; and
   a control system operatively coupled to each motor assembly of said plurality of motor assemblies to selectively operate each motor assembly to independently convey each transport vehicle of said plurality of transport vehicles along said transportation network, said control system configured to:
      assign a transport vehicle to convey a commodity along a predetermined vehicle path trajectory; and
      transmit a notification to a user input device when the predetermined vehicle path trajectory is different from an actual vehicle path trajectory.

2. A transport and handling system in accordance with claim 1, wherein each of said plurality of motor assemblies comprises a magnetic induction motor configured to generate a magnetic field to move a corresponding transport vehicle along the associated predefined network segment.

3. A transport and handling system in accordance with claim 2, wherein said control system is configured to energize a motor assembly of said plurality of motor assemblies when a transport vehicle of said plurality of transport vehicles is within a predefined network segment associated with said motor assembly, and to de-energize said motor assembly when said transport vehicle is not located within the associated predefined network segment.

4. A transport and handling system in accordance with claim 2, wherein each transport vehicle of said plurality of transport vehicles comprises at least one magnetic plate that is configured to interact with a magnetic field generated by a corresponding magnetic induction motor to facilitate moving said transport vehicle along said transportation network.

5. A transport and handling system in accordance with claim 1, wherein said transportation network comprises:
   a central travel line;
   a plurality of branch lines extending from said central travel line to couple each location of said plurality of locations with said central travel line; and
   a plurality of passive switching structures coupled between said central travel line and each branch line of said plurality of branch lines, each passive switching structure of said plurality of switching structures is configured to enable a transport vehicle of said plurality of transport vehicles to travel along said central travel line when said transport vehicle is traveling in a first direction, and to enable said transport vehicle to travel from said central line to a corresponding branch line when said transport vehicle is traveling in a second direction than is different that the first direction.

6. A transport and handling system in accordance with claim 1, wherein said control system further comprises a plurality of sensors, at least one sensor of said plurality of sensors is coupled to each motor assembly of said plurality of motor assemblies, each sensor is configured to sense a position of said assigned transport vehicle with respect to a corresponding motor assembly.

7. A transportation management system for use in automatically conveying a commodity along a transportation network, the transportation network including a plurality of predefined paths of travel extending between a plurality of locations, said transportation management system comprising a processor configured to:
   receive a request to convey a commodity along the transportation network;
   assign a transport vehicle to convey the commodity along the transportation network;
   calculate a vehicle path trajectory along the transportation network including an origin waypoint for receiving the commodity and a destination waypoint for offloading the commodity based at least in part on the location of the assigned transport vehicle along the transportation network;
   convey the assigned transport vehicle along the calculated vehicle path trajectory; and
   transmit a notification to a user input device when the calculated vehicle path trajectory is different from an actual vehicle path trajectory.

8. A transportation management system in accordance with claim 7, wherein said processor is further configured to selectively operate a plurality of motor assemblies oriented along the transportation network to convey the assigned transport vehicle along the transportation network.

9. A transportation management system in accordance with claim 8, wherein said processor is further configured to:
   determine a location of the assigned transport vehicle associated with the unique vehicle identifier along the transportation network; and
   selectively operate a motor assembly adjacent the assigned transport vehicle to convey the assigned transport vehicle along the transportation network.

10. A transportation management system in accordance with claim 9, wherein each motor assembly of the plurality of motor assemblies is oriented with respect to a predefined segment of the transportation network, said processor is configured to energize a motor assembly of the plurality of motor assemblies when the assigned transport vehicle is located within a predefined segment associated with the motor assembly, and to de-energize the motor assembly when the assigned transport vehicle is not located within the associated predefined segment.

11. A transportation management system in accordance with claim 10, wherein said processor is further configured to:
   receive a request to deliver the commodity to a destination location along the transportation network;
   determine a location of the requested commodity along the transportation network; and
   calculate the vehicle path trajectory including an origin waypoint associated with the determined commodity location, and a destination waypoint associated with the destination location.

12. A method of transporting a commodity along a transportation network, said method comprising:
   receiving, by a transport management system, a request to convey a commodity along a transportation network, the transportation network including a plurality of predefined paths of travel extending between a plurality of locations;
   assigning a transport vehicle to convey the commodity along the transportation network;
   determining a vehicle path trajectory including an origin waypoint and a destination waypoint based at least in part on the location of the assigned transport vehicle along the transportation network;
   conveying the assigned transport vehicle along the determined vehicle path trajectory; and
   transmitting a notification to a user input device when the determined vehicle path trajectory is different from an actual vehicle path trajectory.

13. A method in accordance with claim 12, further comprising selectively operating a plurality of motor assemblies that are oriented along the transportation network to convey the assigned transport vehicle along the transportation network, wherein each motor assembly is oriented with respect to a predefined segment of the transportation network.

14. A method in accordance with claim 13, further comprising:
   receiving a signal indicative of a position of the transport vehicle along the transportation network; and
   selectively operating a motor assembly adjacent the sensed position to convey the transport vehicle along the transportation network.

15. A method in accordance with claim 13, further comprising:
   transmitting, from the transport management system to a vehicle registry device, a request to assign a transport vehicle to deliver the commodity;
   determining a status of a plurality of transport vehicles along the transportation network;
   assigning the transport vehicle to convey the commodity based at least in part on the determined status of each transport vehicle; and
   receiving, from the vehicle registry device, a verification message including a unique vehicle identifier associated with the assigned transport vehicle.

16. A method in accordance with claim 15, further comprising:
- determining a location of the assigned transport vehicle associated with the unique vehicle identifier along the transportation network; and
- selectively operating a motor assembly adjacent the assigned transport vehicle to convey the assigned transport vehicle along the transportation network.

17. A method in accordance with claim 15, further comprising:
- receiving a signal indicative of a position of each transport vehicle along the transportation network; and
- assigning the transport vehicle to convey the commodity based at least in part on the sensed position of each transport vehicle.

18. A method in accordance with claim 15, further comprising:
- receiving a signal indicative of an operating status of each transport vehicle of the plurality of transport vehicles along the transportation network; and
- assigning the transport vehicle to convey the commodity based at least in part on the operating status.

19. A method in accordance with claim 12, further comprising:
- receiving a request to deliver the commodity to a destination location along the transportation network;
- determining a location of the requested commodity along the transportation network; and
- determining the vehicle path trajectory including an origin waypoint associated with the determined commodity location, and a destination waypoint associated with the destination location.

\* \* \* \* \*